United States Patent
Kim et al.

(10) Patent No.: US 12,175,770 B2
(45) Date of Patent: Dec. 24, 2024

(54) LANE EXTRACTION METHOD USING PROJECTION TRANSFORMATION OF THREE-DIMENSIONAL POINT CLOUD MAP

(71) Applicant: MOBILTECH, Seoul (KR)

(72) Inventors: Jae Seung Kim, Seoul (KR); Yeon Soo Park, Seoul (KR)

(73) Assignee: MOBILTECH, Seoul (KR)

( * ) Notice: Subject to any disclaimer, the term of this patent is extended or adjusted under 35 U.S.C. 154(b) by 399 days.

(21) Appl. No.: 17/834,501

(22) Filed: Jun. 7, 2022

(65) Prior Publication Data
US 2023/0005278 A1  Jan. 5, 2023

(30) Foreign Application Priority Data
Jun. 30, 2021 (KR) .................... 10-2021-0085339

(51) Int. Cl.
*G06V 20/56* (2022.01)
*G01S 7/48* (2006.01)
(Continued)

(52) U.S. Cl.
CPC .......... *G06V 20/588* (2022.01); *G01S 7/4802* (2013.01); *G06T 7/11* (2017.01);
(Continued)

(58) Field of Classification Search
None
See application file for complete search history.

(56) References Cited

U.S. PATENT DOCUMENTS

2019/0147255 A1* 5/2019 Homayounfar ...... G05D 1/0088
701/23
2020/0098135 A1* 3/2020 Ganjineh ............. G06V 20/588
(Continued)

FOREIGN PATENT DOCUMENTS

CN 111145203 A * 5/2020 .............. G06N 3/04
KR 10-2065693 B1 1/2020
(Continued)

OTHER PUBLICATIONS

L. Ma et al., "Capsule-Based Networks for Road Marking Extraction and Classification From Mobile LiDAR Point Clouds," in IEEE Transactions on Intelligent Transportation Systems, vol. 22, No. 4, pp. 1981-1995, Apr. 2021, doi: 10.1109/TITS.2020.2990120 (Year: 2021).*

(Continued)

*Primary Examiner* — Vu Le
*Assistant Examiner* — Charles C L Penny
(74) *Attorney, Agent, or Firm* — Bridgeway IP Law Group, PLLC; Jihun Kim (57) ABSTRACT

A lane extraction method uses projection transformation of a 3D point cloud map, by which the amount of operations required to extract the coordinates of a lane is reduced by performing deep learning and lane extraction in a two-dimensional (2D) domain, and therefore, lane information is obtained in real time. In addition, black-and-white brightness, which is most important information for lane extraction on an image, is substituted by the reflection intensity of a light detection and ranging (LiDAR) sensor so that a deep learning model capable of accurately extracting a lane is provided. Therefore, reliability and competitiveness is enhanced in the field of autonomous driving, the field of road recognition, the field of lane recognition, and the field of HD road maps for autonomous driving, and the fields similar or related thereto, and more particularly, in the fields of road recognition and autonomous driving using LiDAR.

8 Claims, 10 Drawing Sheets

(51) Int. Cl.
*G06T 7/11* (2017.01)
*G06T 11/00* (2006.01)
*G06V 10/774* (2022.01)

(52) U.S. Cl.
CPC ............ *G06T 11/00* (2013.01); *G06V 10/774* (2022.01); *G06T 2207/10028* (2013.01); *G06T 2207/20021* (2013.01); *G06T 2207/20068* (2013.01); *G06T 2207/20076* (2013.01); *G06T 2207/20081* (2013.01); *G06T 2207/30256* (2013.01); *G06T 2210/32* (2013.01); *G06T 2210/56* (2013.01)

(56) References Cited

U.S. PATENT DOCUMENTS

2020/0302189 A1* 9/2020 Shu .................. G06V 10/82
2021/0190956 A1* 6/2021 Kagan ................ G06T 19/00

FOREIGN PATENT DOCUMENTS

| KR | 10-2020-0020465 | A |   | 2/2020 |            |
|----|-----------------|---|---|--------|------------|
| KR | 10-2021-0041305 |   | * | 4/2021 |            |
| KR | 10-2021-0041305 | A |   | 4/2021 |            |
| WO | WO-2021051344   | A1 | * | 3/2021 | ......... G06K 9/00798 |

OTHER PUBLICATIONS

Y.-T. Cheng, A. Patel, C. Wen, D. Bullock, and A. Habib, "Intensity Thresholding and deep learning based lane marking extraction and lane width estimation from Mobile Light Detection And Ranging (LIDAR) point clouds," Remote Sensing, vol. 12, No. 9, p. 1379, Apr. 2020. doi: 10.3390/rs12091379 (Year: 2020).*

R. Ravi et al., "Lane Width Estimation in Work Zones Using LiDAR-Based Mobile Mapping Systems," in IEEE Transactions on Intelligent Transportation Systems, vol. 21, No. 12, pp. 5189-5212, Dec. 2020, doi: 10.1109/TITS.2019.2949762 (Year: 2020).*

Yongbeom Lee et al., "A Study of Semantic Segmentation for Drivable Space ad Vehicles Detection Based on Deep Learning Using Point Cloud", The Korean Society f Automotive Engineers, 2019 KSAE.

* cited by examiner

LANE EXTRACTION METHOD USING PROJECTION TRANSFORMATION OF THREE-DIMENSIONAL POINT CLOUD MAP

This work is supported by the Korea Agency for Infrastructure Technology Advancement (KAIA) grant funded by the Ministry of Land, Infrastructure and Transport (Grant 22AMDP-C161762-02).

CROSS REFERENCE TO RELATED APPLICATION OF THE INVENTION

The present application claims the benefit of Korean Patent Application No. 10-2021-0085339 filed in the Korean Intellectual Property Office on Jun. 30, 2021, the entire contents of which are incorporated herein by reference.

BACKGROUND OF THE INVENTION

Field of the Invention

The present invention relates to a lane extraction method of using projection transformation of a three-dimensional (3D) point cloud map, by which a lane region is extracted by converting a 3D high-definition (HD) map including a point cloud into a planar image and using a deep learning model.

In particular, the present invention relates to a lane extraction method using projection transformation of a 3D point cloud map, by which the amount of operations required to extract the coordinates of a lane is reduced by performing deep learning and lane extraction in a two-dimensional (2D) domain, and therefore, lane information is obtained in real time.

Background of the Related Art

Unmanned autonomy of vehicles (autonomous vehicles) mainly includes recognizing a surrounding environment (cognitive domain), planning a driving route from the recognized environment (determination domain), and driving along the planned route (control domain).

In particular, the cognitive domain relates to a basic technique initially performed for autonomous driving, and only when techniques in the cognitive domain is accurately performed, techniques in the subsequent determination and control domains may be accurately performed.

Techniques of recognizing a surrounding environment of a vehicle vary with a target environment, in which an autonomous vehicle is intended to drive. In particular, to perform autonomous driving in a road environment designed and constructed for driving of existing manned vehicles, techniques of recognizing various rules of the road are essentially required.

In particular, recognizing and moving along a lane may be considered as the most basic technique for safe driving together with manned vehicles.

One of the methods of recognizing a lane on the road is based on an image obtained through a camera. With the development of image processing technology, there has been a lot of research into extracting a lane from a camera image.

Recently, most research into lane extraction has been based on deep learning and variously modified using a semantic segmentation model as a framework.

Camera images are mostly obtained from a camera mounted on the front of a vehicle, and estimation accuracy significantly decreases at the edge or vanishing point of an image because of the perspective and viewing angle of the camera.

In addition, due to the characteristics of a camera image, it may be hard to recognize a lane because of an environmental condition, such as rain or the amount of light incident to the road.

To solve these problems, Korea Patent Publication 10-2083909 (referred to as prior art), entitled "Automatic Extraction Method for Lane Data Information for Autonomous Driving Vehicles Based on Point Cloud Map", discloses a technique for obtaining 3D information of a lane from 3D point cloud data obtained using light detection and ranging (LiDAR).

However, in the case of the prior art, it takes a lot of time to perform operations because the operations are performed using 3D point cloud data in a process of extracting lane data.

In addition, because of the scarcity of a point cloud included in a LiDAR frame, it is more difficult to recognize a lane when the lane is farther away from a LiDAR sensor. In particular, there is a greater problem when there is damage to a lane or when lane marking lines are far apart from each other.

SUMMARY OF THE INVENTION

The present invention provides a lane extraction method using projection transformation of a three-dimensional (3D) point cloud map, by which a lane region is extracted by converting a 3D high-definition (HD) map including a point cloud into a planar image and using a deep learning model.

The present invention also provides a lane extraction method using projection transformation of a 3D point cloud map, by which the amount of operations required to extract the coordinates of a lane is reduced by performing deep learning and lane extraction in a two-dimensional (2D) domain, and therefore, lane information is obtained in real time.

The present invention also provides a lane extraction method using projection transformation of a 3D point cloud map, by which line extraction is effectively automated and performed at a high speed with high accuracy by minimizing the amount of operations required to extract the coordinates of a lane.

According to an aspect of the present invention, there is provided a lane extraction method using projection transformation of a 3D point cloud map. The lane extraction method includes a deep learning step of projecting a training 3D HD map onto a planar image, extracting a lane on a 2D map resulting from the projection, matching the 2D map with a planar image of the lane, setting the matched 2D map and planar image of the lane as training data, and training a deep learning model of extracting a lane from a map, based on the training data; and a lane extraction step of projecting a target 3D HD map onto a planar map image, extracting a planar lane image from the planar map image using the deep learning model, and converting the planar lane image into 3D coordinates.

The deep learning step may include a training map projection process of projecting and converting a training 3D point cloud map corresponding to the training 3D HD map into a top-view image; a lane projection process of extracting a lane point from the training 3D point cloud map and projecting and converting the lane point into the top-view image; a training data setting process of matching and setting the 2D map resulting from the projection and the lane as the training data; and a deep learning process of training the deep learning model based on the training data.

The training map projection process may include a view conversion process of converting the training 3D point cloud map into the top-view image using reflection intensity; a map segmentation process of segmenting the 2D point cloud map into grids having a certain size; and a planar map imaging process of making the 2D point cloud map into an image grid by grid.

The lane extraction method may further include, after the planar map imaging process, a meaningless image removing process of removing a grid planar map image having no roadway from the planar map image.

The lane projection process may include a lane point extraction process of extracting a lane point from the training 3D point cloud map; a line fitting process of fitting the lane point to a line; and a planar lane imaging process of making the line into an image for each grid.

The training data setting process may include an identification (ID) assignment process of assigning the global coordinate value to each grid as an ID; and an image matching process of matching and setting a planar map image and a planar lane image, which are assigned a same ID, as an image pair.

The lane extraction step may include a target map projection process of projecting a target 3D point cloud map corresponding to the target 3D HD map onto a top-view image; a lane extraction process of extracting the planar lane image from the planar map image using the deep learning model; and a lane coordinate reconstruction process of reconstructing global coordinates from the planar lane image.

The target map projection process may include segmenting a 2D point cloud map into grids having a certain size, the 2D point cloud map corresponding to the top-view image onto which the target 3D point cloud map is projected. The lane coordinate reconstruction process may include reconstructing a 3D coordinate point cloud from the planar lane image by using a global coordinate value assigned to each grid as the ID.

The lane coordinate reconstruction process may include a planar coordinate assignment process of converting the planar lane image into a lane point by assigning an x-coordinate and a y-coordinate to the planar lane image using the global coordinate value assigned to each grid; a 3D coordinate determination process of determining coordinates of a point closest to the x- and y-coordinates on the target 3D HD map; and a z-coordinate assignment process of assigning a z-coordinate of the point on the target 3D HD map to the lane point.

Alternatively, the lane coordinate reconstruction process may include a planar coordinate assignment process of converting the planar lane image into a lane point by assigning an x-coordinate and a y-coordinate to the planar lane image using the global coordinate value assigned to each grid; an adjacent point determination process of determining 3D points within a certain distance from the x- and y-coordinates on the target 3D HD map; and a z-coordinate assignment process of assigning an average of z-coordinates of the 3D points to the lane point.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE EMBODIMENTS

Examples of a lane extraction method using projection transformation of a three-dimensional (3D) point cloud map may be variously used. Embodiments are described below with reference to the accompanying drawings.

Figure 1:
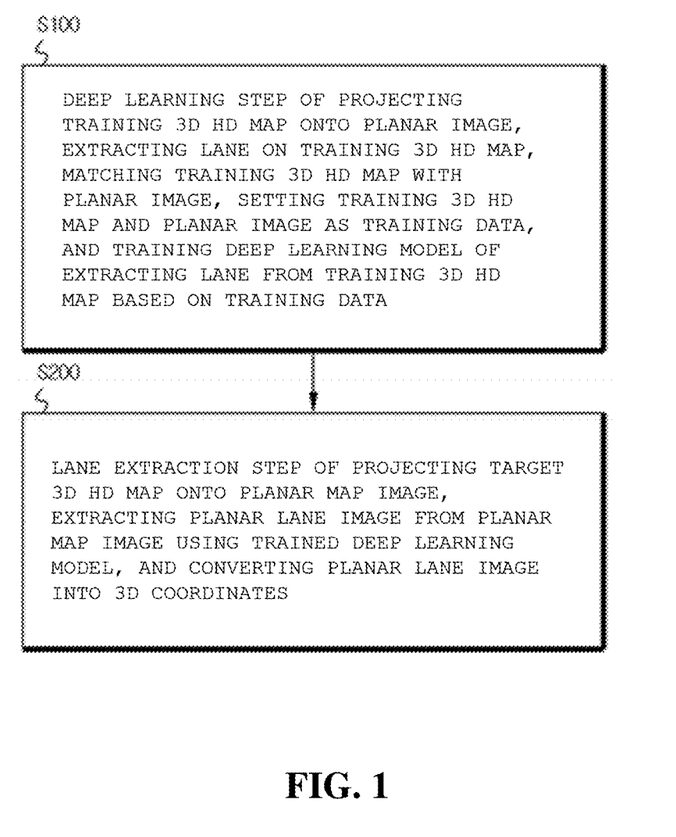
FIG. 1 is a flowchart of a lane extraction method using projection transformation of a three-dimensional (3D) point cloud map, according to an embodiment.

FIG. 1 is a flowchart of a lane extraction method using projection transformation of a 3D point cloud map, according to an embodiment.

Referring to FIG. 1, the lane extraction method using projection transformation of a 3D point cloud map may include a deep learning step S100 and a lane extraction step S200.

In the deep learning step S100, a method of extracting lane information, e.g., 3D coordinates of point cloud data of a lane, from a 3D high-definition (HD) map may be trained.

At this time, when lane information is directly extracted from a 3D point cloud map, i.e., a 3D HD map, as described above, the amount of data operations is huge. Therefore, in an embodiment of the present invention, a lane is extracted after 3D information is converted into two-dimensional (2D) information and then reconstructed in three dimensions.

In detail, in the deep learning step S100, after a training 3D HD map is projected onto a planar image, a lane on a 2D map resulting from the projection is extracted. The 2D map and a planar image of the lane are matched with each other and set as training data, and a deep learning model of extracting a lane from a map is trained based on the training data.

The lane extraction step S200 is a process of extracting 3D coordinates of a lane included in a point cloud map from a 3D point cloud measured using light detection and ranging (LiDAR). In the lane extraction step S200, after a target 3D HD map is projected onto a planar map image, a planar lane image is extracted from the planar map image using the deep learning model that has been trained in the deep learning step S100 and then converted into 3D coordinates.

Hereinafter, each operation in FIG. 1 is described in detail.

Figure 2:
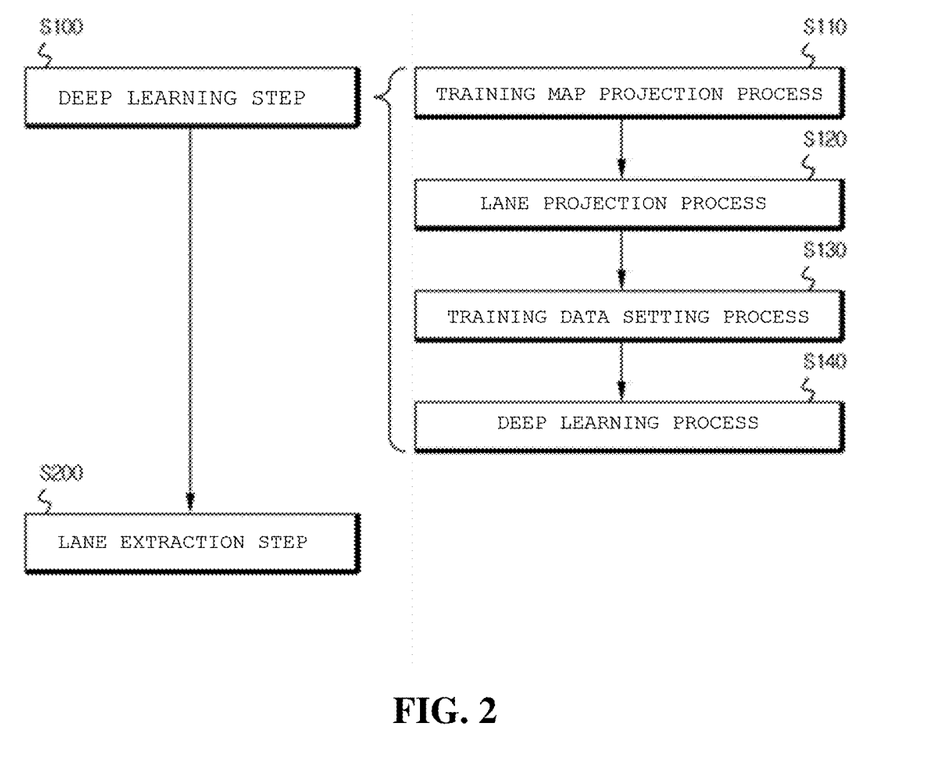
FIG. 2 is a detailed flowchart of a step S100 in FIG. 1, according to an embodiment.

FIG. 2 is a detailed flowchart of deep learning operation S100 in FIG. 1, according to an embodiment.

Referring to FIG. 2, deep learning operation S100 may include a training map projection process S110, a lane projection process S120, a training data setting process S130, and a deep learning process S140.

In the training map projection process S110, a training 3D point cloud map corresponding to the training 3D HD map may be projected and converted into a top-view image.

For example, a 3D point cloud map may be converted into a 2D map by removing a z-coordinate from the 3D coordinates of each point in the 3D point cloud map.

In the lane projection process S120, a lane point may be extracted from the training 3D point cloud map and projected and converted into the top-view image.

For example, because lane point extraction for learning is performed once and unrelated to analysis of a 3D point cloud map actually measured afterward, the lane point extraction may be manually performed.

In the training data setting process S130, the 2D map resulting from the projection into the top-view image and the lane are matched with each other and set as training data. The training data setting process S130 may include a process of matching a question (a map) with an answer (a lane).

In the deep learning process S140, a lane extraction deep learning model is trained based on the training data, in which a question and an answer are matched with each other. The deep learning process S140 includes a process of learning an answer to a question to obtain the answer when the question is given.

Figure 3:
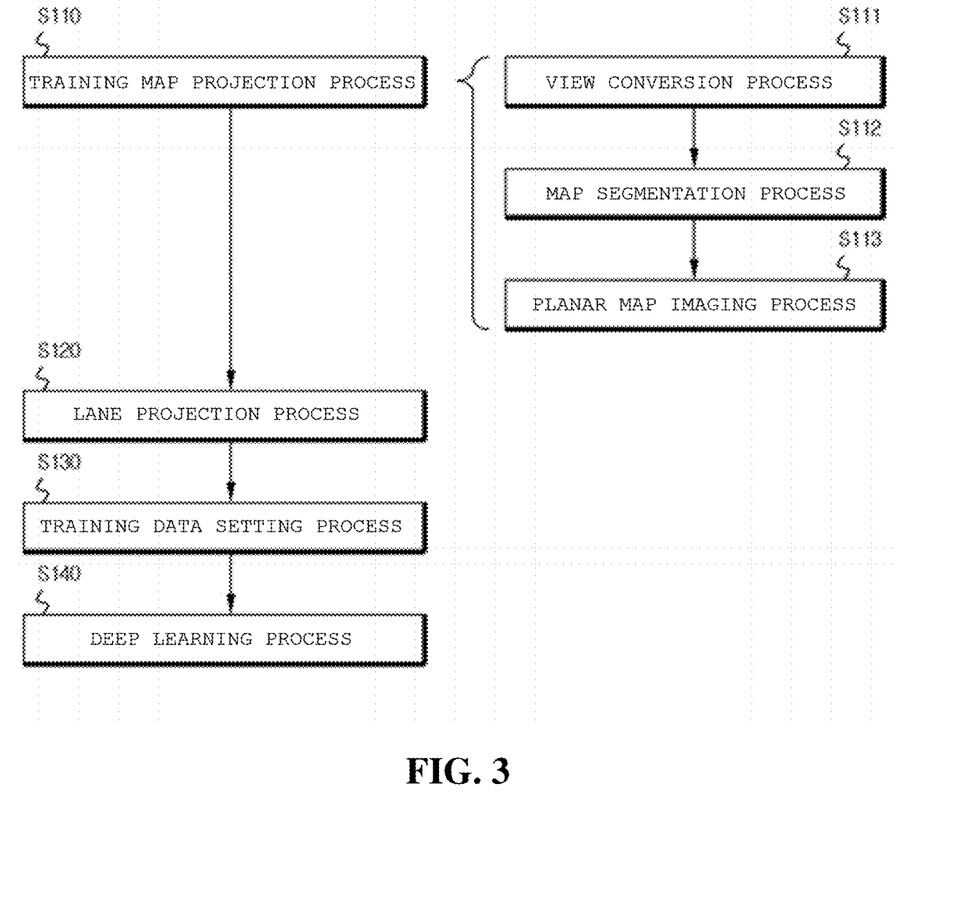
FIG. 3 is a detailed flowchart of a process S110 in FIG. 2, according to an embodiment.

FIG. 3 is a detailed flowchart of the training map projection process S110 in FIG. 2, according to an embodiment.

Referring to FIG. 3, the training map projection process S110 includes a view conversion process S111, a map segmentation process S112, and a planar map imaging process S113.

In the training map projection process S110, after the training 3D point cloud map may be converted into a top view using reflection intensity in the view conversion process S111, the 2D point cloud map may be segmented into grids having a certain size in the map segmentation process S112, and the 2D point cloud map may be made into an image grid by grid in the planar map imaging process S113.

In detail, an image, which is appropriate to allow the deep learning model to recognize a lane characteristic, may be generated using the reflection intensity of 3D point cloud data.

For example, after each grid having a certain size is generated using an x-coordinate and a y-coordinate of a 3D map, an image corresponding to the grid may be generated by projecting point cloud data of the grid onto an XY plane.

At this time, each image may be generated as a gray image having the reflection intensity of a projected point as a pixel value.

In addition, for the reconstruction of 3D coordinates described below, information on global coordinates may be preserved by giving each image, as an identification (ID), the coordinate value of the left top of a corresponding grid.

After the planar map imaging process S113, a meaningless image removing process may be performed. In the meaningless image removing process, a grid planar map image having no roadway, e.g., an empty image including no points or an image including only a structure, such as a building, forest, or a parking lot, but not a roadway, may be removed.

Figure 4:
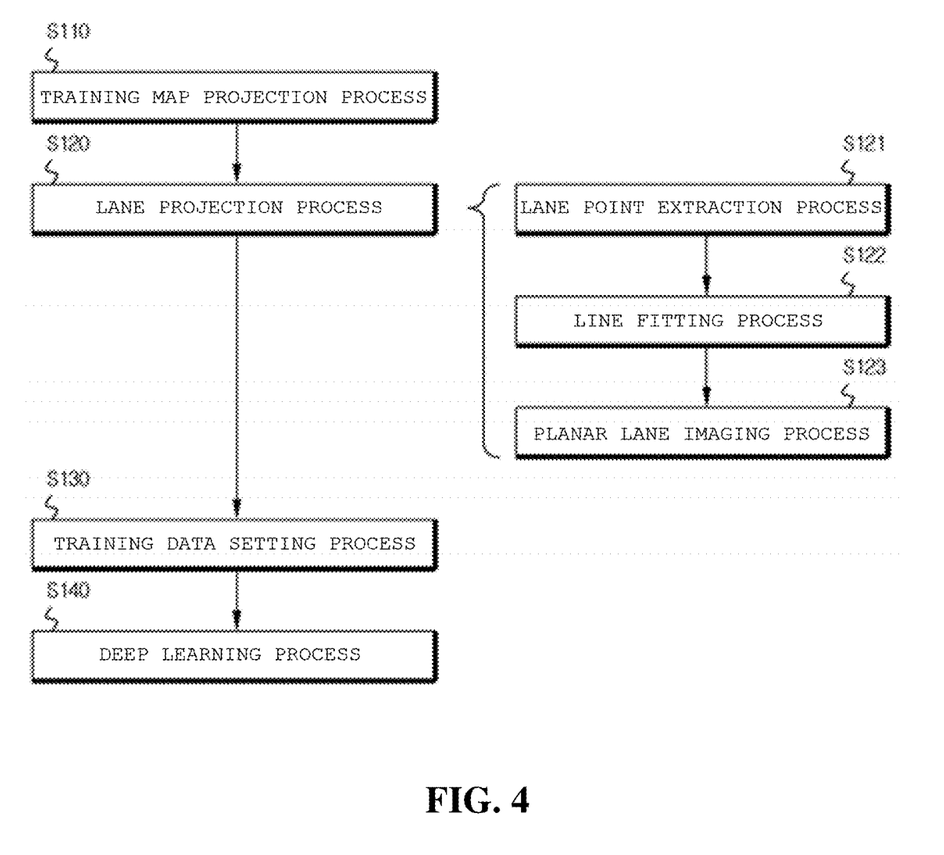
FIG. 4 is a detailed flowchart of a process S120 in FIG. 2, according to an embodiment.

FIG. 4 is a detailed flowchart of the lane projection process S120 in FIG. 2, according to an embodiment.

Referring to FIG. 4, the lane projection process S120 may include a lane point extraction process S121, a line fitting process S122, and a planar lane imaging process S123.

In the lane projection process S120, after the lane point is extracted from the training 3D point cloud map in the lane point extraction process S121, the lane point may be fitted to a line in the line fitting process S122, and the line may be made into an image for each grid in the planar lane imaging process S123.

In detail, the lane point may be manually and directly extracted from the training 3D point cloud map in the lane point extraction process S121, and ling fitting may be performed on a sample, i.e., the lane point, in the line fitting process S122.

The point cloud data of a lane, which has been interpolated into a line through the process described above, may have coordinates that coincide with coordinates on the 3D HD map.

In the planar lane imaging process S123, the point cloud data of a lane may be converted into a segmented image by using the grid that has been applied to the point cloud data in the map segmentation process S112.

At this time, the segmented image of the lane may include a binary image, which has a maximum brightness of 255 for pixels corresponding to the lane and a minimum brightness of 0 for pixels corresponding to a background excluding the lane.

Figure 5:
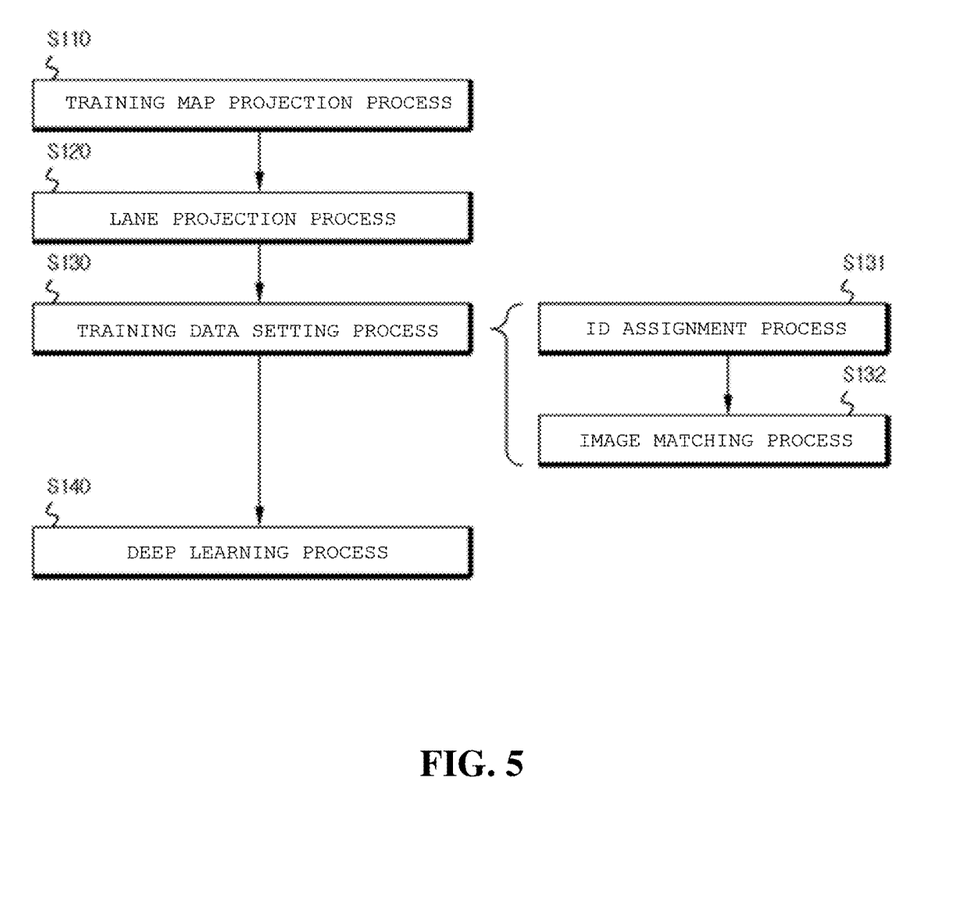
FIG. 5 is a detailed flowchart of a process S130 in FIG. 2, according to an embodiment.

FIG. 5 is a detailed flowchart of the training data setting process S130 in FIG. 2, according to an embodiment.

Referring to FIG. 5, the training data setting process S130 may include an ID assignment process S131 and an image matching process S132.

In the training data setting process S130, a coordinate value corresponding to global coordinates may be assigned to each grid as an ID. Here, the ID may include the coordinate value of the left top of the grid.

Thereafter, a planar map image and a planar lane image, which are assigned the same ID, may be matched with each other and set as an image pair. Here, the planar lane image may be the ground truth of the planar map image.

The deep learning process S140 is described in detail below.

A basic encoder-decoder structure additionally including skip connection is used as a base line. To reduce checkerboard artifacts often occurring in the upsampling of a decoder, not stride convolution but anti-aliasing, e.g., BlurPool, is used in the downsampling of an encoder. Even for the upsampling, linear interpolation and normal convolution is used instead of deconvolution (dilated convolution) that is a major cause of an artifact.

A two-channel image, into which a map segment image and a result of performing Canny edge filtering on the map segment image are concatenated, is used as an input of the deep learning model.

An output of the deep learning model is a lane mask predicted with respect to the input and has the same size as the input image.

Figure 6:
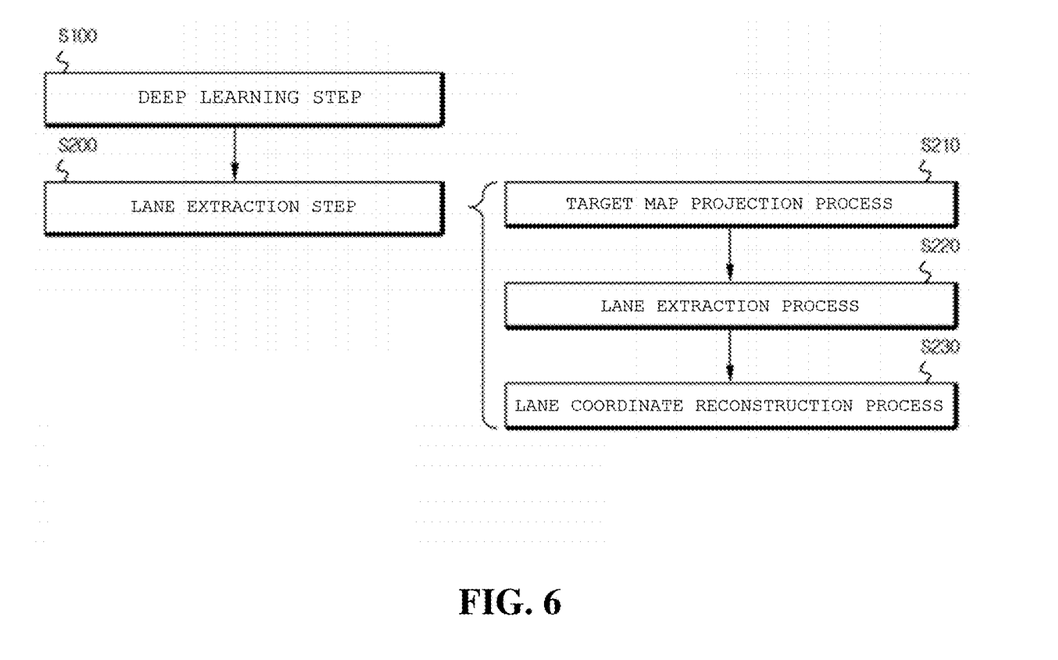
FIG. 6 is a detailed flowchart of a step S200 in FIG. 1, according to an embodiment.

FIG. 6 is a detailed flowchart of the lane extraction step S200 in FIG. 1, according to an embodiment.

Referring to FIG. 6, the lane extraction step S200 may include a target map projection process S210, a lane extraction process S220, and a lane coordinate reconstruction process S230.

In the lane extraction step S200, a target 3D point cloud map corresponding to the target 3D HD map may be projected and converted into a top-view image in the target map projection process S210, a planar lane image may be extracted from planar map image using the deep learning model in the lane extraction process S220, and the global coordinates may be reconstructed from the planar lane image in the lane coordinate reconstruction process S230.

At this time, the target map projection process S210 may include segmenting a 2D point cloud map, onto which a 3D point cloud map is projected, into grids having a certain size. The lane coordinate reconstruction process S230 may include reconstructing a 3D coordinate point cloud from a planar lane image by using a global coordinate value assigned to each grid as an ID.

In detail, when there is an entire map from which a lane is to be obtained, the map may be divided into segment images using grids, the segment images may be sequentially input to the deep learning model, and a lane image corresponding to each segment image may be obtained.

At this time, the lane image obtained as an output may include a gray image, in which a pixel of the lane image has a pixel value between 0 and 1 that expresses the probability of corresponding to a lane.

Pixel values may be binarized using a certain threshold, and the coordinates of a pixel having a value of 1 may be converted into global coordinates using a grid ID of the lane image.

This process may be repeatedly performed on the lane image of every grid so that lane points for the entire map may be obtained.

Figure 7:
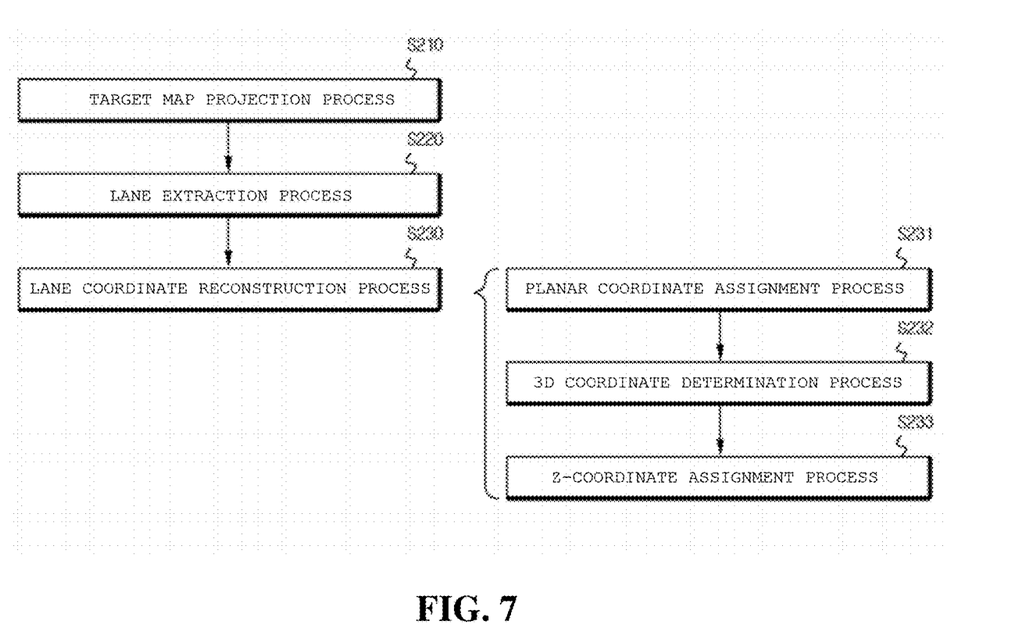
FIG. 7 is a detailed flowchart of a process S230 in FIG. 6, according to an embodiment.

FIG. 7 is a detailed flowchart of the lane coordinate reconstruction process S230 in FIG. 6, according to an embodiment.

Referring to FIG. 7, the lane coordinate reconstruction process S230 may include a planar coordinate assignment process S231 in which the planar lane image is converted into a lane point by assigning an x-coordinate and a y-coordinate to the planar lane image using a global coordinate value assigned to each grid, a 3D coordinate determination process S232 in which the coordinates of a point closest to the x- and y-coordinates are determined on the target 3D HD map, and a z-coordinate assignment process S233 in which a z-coordinate of the point on the target 3D HD map is assigned to the lane point.

When the lane coordinate reconstruction process S230 is completed, the lane point may be matched to a point closest thereto on the 3D HD map according to a distance based on the x- and y-coordinates of the lane point so that the z-coordinate of the point on the 3D HD map may be assigned as the z-coordinate of the lane point.

Figure 8:
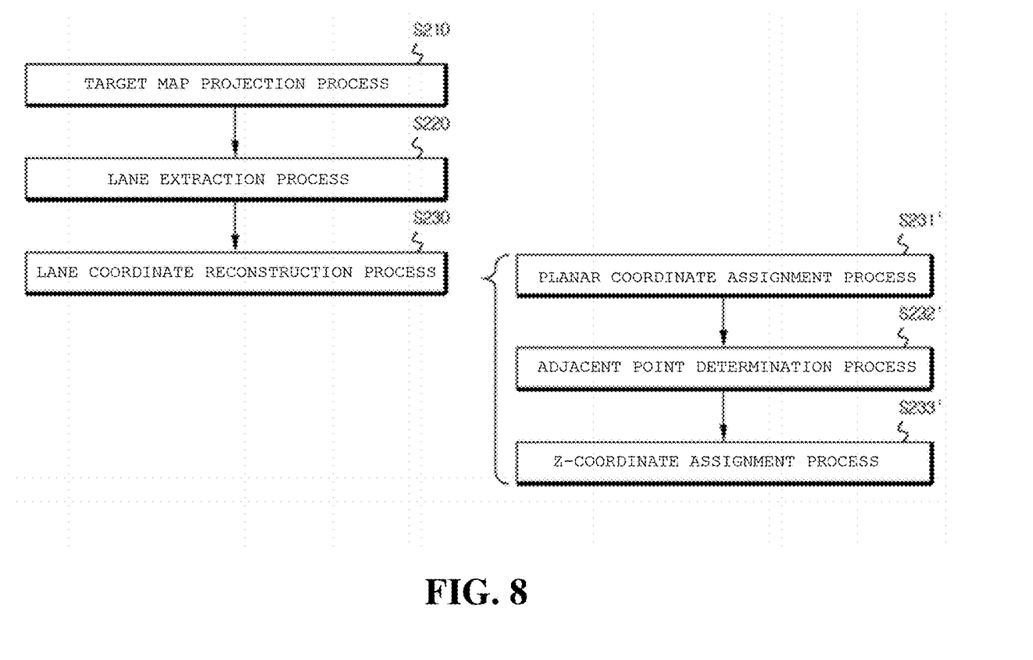
FIG. 8 is a detailed flowchart of a process S230 in FIG. 6, according to another embodiment.

FIG. 8 is a detailed flowchart of the lane coordinate reconstruction process S230 in FIG. 6, according to another embodiment.

Referring to FIG. 8, the lane coordinate reconstruction process S230 may include a planar coordinate assignment process S231' in which a planar lane image is converted into a lane point by assigning an x-coordinate and a y-coordinate to the planar lane image using a global coordinate value assigned to each grid, an adjacent point determination process S232' in which 3D points within a certain distance from the x- and y-coordinates on the target 3D HD map are determined, and a z-coordinate assignment process S233' in which the average of z-coordinates of the 3D points is assigned to the lane point.

In other words, the average of z-coordinate values of points within a certain radius around a point closest to the x- and y-coordinates on the target 3D HD map may be calculated and used as the z-coordinate of the lane point. Through this process, the influence of noise around the ground may be minimized.

Consequently, x-, y-, and z-lane coordinates that coincide with a point cloud on a 3D map may be obtained, and accordingly, a lane may be recognized and marked on the 3D map.

Figure 9:
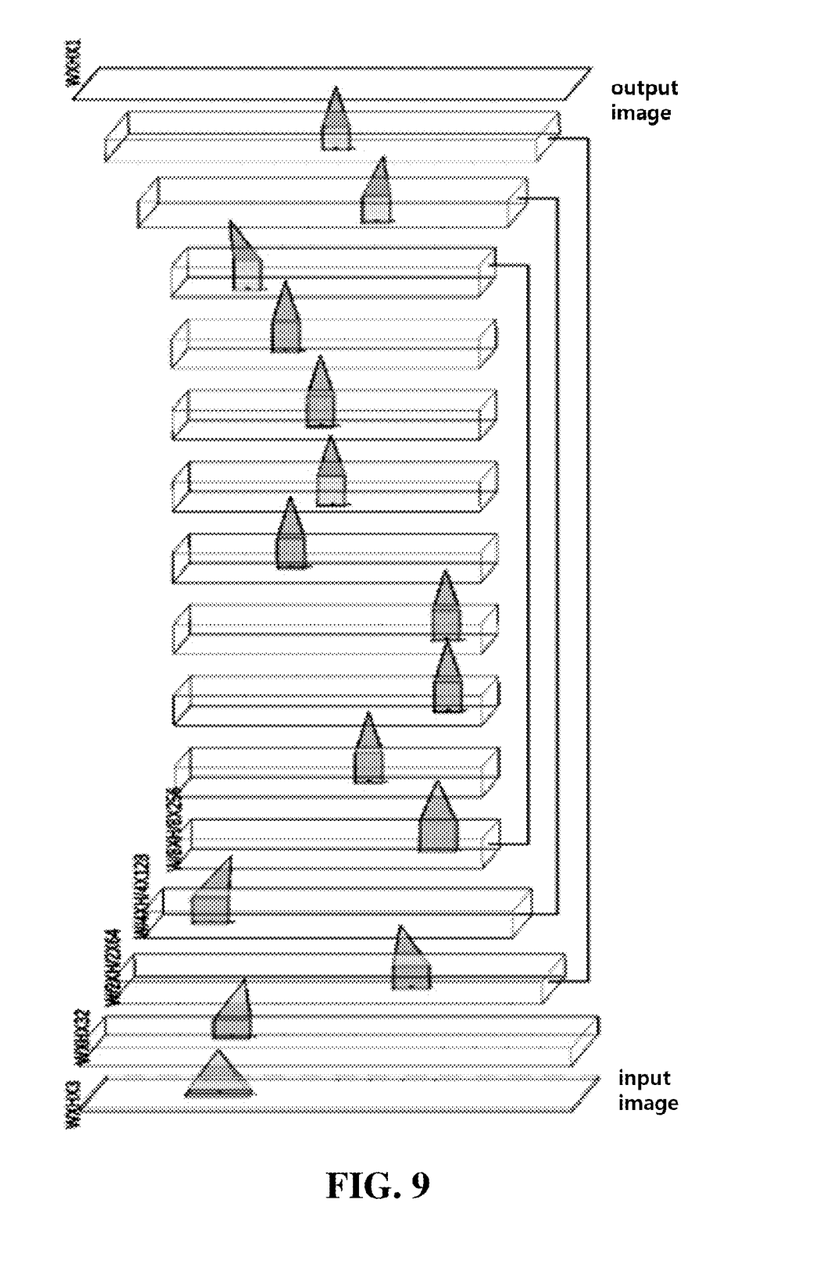
FIG. 9 is a diagram of the structure of a leaning network used in the step S100 in FIG. 1.

FIG. 9 is a diagram of the structure of a leaning network used in a learning process in a lane extraction method, according to an embodiment.

Figure 10:
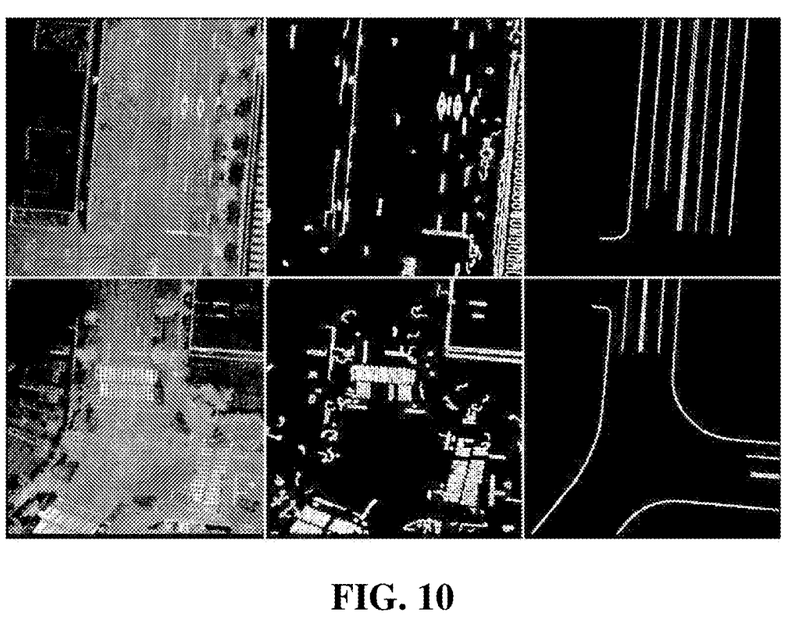
FIG. 10 is a diagram for describing a process of generating training data used in the step S100 in FIG. 1.

FIG. 10 shows an example of data produced from a process of generating a data set. The first column of FIG. 10 shows top-view segment images of a map, the second column of FIG. 10 shows edge images obtained by applying a Canny edge filter to the top-view segment images, and the third column of FIG. 10 shows lane images of a grid.

Here, the images in the first and second columns may be used as inputs of a lane extraction model, and the lane extraction model may be trained on the images in the third column.

According to the embodiments of the present invention, a 3D HD map including a point cloud may be converted into a planar image, and a lane region may be extracted using a 2D image deep learning model.

In particular, because deep learning and lane extraction is performed in a 2D domain, the amount of operations required to extract the coordinates of a lane may be minimized, and accordingly, lane information may be obtained in real time.

Moreover, because the amount of operations required to extract the coordinates of a lane is minimized, a lane extraction process may be effectively automated and performed at a high speed with high accuracy.

In addition, because black-and-white brightness, which is most important information for lane extraction on an image, is substituted by the reflection intensity of a LiDAR sensor, a deep learning model capable of accurately extracting a lane may be provided.

Accordingly, during autonomous driving based on a 3D HD map, various kinds of information about a driving environment may be quickly and accurately determined through highly accurate real-time analysis.

In addition, because accurate information about quickly changing and newly built roadways is obtained, an autonomous driving system may be updated in real time.

Therefore, reliability and competitiveness may be enhanced in the field of autonomous driving, the field of road recognition, the field of lane recognition, and the field of HD road maps for autonomous driving, and the fields similar or related thereto, and more particularly, in the fields of road recognition and autonomous driving using LiDAR.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A lane extraction method using projection transformation of a three-dimensional (3D) point cloud map, the lane extraction method comprising:
   a deep learning step of projecting a training 3D high-definition (HD) map onto a planar image, extracting a lane on a two-dimensional (2D) map resulting from the projection, matching the 2D map with a planar image of the lane, setting the matched 2D map and planar image of the lane as training data, and training a deep learning model of extracting a lane from a map, based on the training data; and a lane extraction step of projecting a target 3D HD map onto a planar map image, extracting a planar lane image from the planar map image using the deep learning model, and converting the planar lane image into 3D coordinates, wherein the lane extraction step includes:

a target map projection process of projecting a target 3D point cloud map corresponding to the target 3D HD map onto a top-view image;

a lane extraction process of extracting the planar lane image from the planar map image using the deep learning model; and a lane coordinate reconstruction process of reconstructing global coordinates from the planar lane image, wherein the target map projection process includes segmenting a two-dimensional (2D) point cloud map into grids having a certain size, the 2D point cloud map corresponding to the top-view image onto which the target 3D point cloud map is projected, the lane extraction process includes extracting the planar lane image including a gray image, in which a pixel of the planar lane image has a pixel value between 0 and 1 that expresses a probability of corresponding to the lane, and the lane coordinate reconstruction process includes reconstructing a 3D coordinate point cloud from the planar lane image by using a global coordinate value assigned to each grid as an identification (ID), wherein pixel values of the planar lane image are binarized using a certain threshold, and coordinates of a pixel having a value of 1 is converted into global coordinates using the ID of each grid of the planar lane image.

2. The lane extraction method of claim 1, wherein the deep learning step includes:

a training map projection process of projecting and converting a training 3D point cloud map corresponding to the training 3D HD map into a top-view image;

a lane projection process of extracting a lane point from the training 3D point cloud map and projecting and converting the lane point into the top-view image;

a training data setting process of matching and setting the 2D map resulting from the projection and the lane as the training data; and a deep learning process of training the deep learning model based on the training data.

3. The lane extraction method of claim 2, wherein the training map projection process includes:

a view conversion process of converting the training 3D point cloud map into the top-view image using reflection intensity;

a map segmentation process of segmenting the 2D point cloud map into grids having a certain size; and a planar map imaging process of making the 2D point cloud map into an image grid by grid.

4. The lane extraction method of claim 3, further comprising, after the planar map imaging process, a meaningless image removing process of removing a grid planar map image having no roadway from the planar map image.

5. The lane extraction method of claim 3, wherein the lane projection process includes:

a lane point extraction process of extracting a lane point from the training 3D point cloud map;

a line fitting process of fitting the lane point to a line; and a planar lane imaging process of making the line into an image for each grid.

6. The lane extraction method of claim 5, wherein the training data setting process includes:

an ID assignment process of assigning the global coordinate value to each grid as the ID; and an image matching process of matching and setting a planar map image and a planar lane image, which are assigned a same ID, as an image pair.

7. The lane extraction method of claim 1, wherein the lane coordinate reconstruction process includes:

a planar coordinate assignment process of converting the planar lane image into a lane point by assigning an x-coordinate and a y-coordinate to the planar lane image using the global coordinate value assigned to each grid;

a 3D coordinate determination process of determining coordinates of a point closest to the x- and y-coordinates on the target 3D HD map; and a z-coordinate assignment process of assigning a z-coordinate of the point on the target 3D HD map to the lane point.

8. The lane extraction method of claim 1, wherein the lane coordinate reconstruction process includes:

a planar coordinate assignment process of converting the planar lane image into a lane point by assigning an x-coordinate and a y-coordinate to the planar lane image using the global coordinate value assigned to each grid;

an adjacent point determination process of determining 3D points within a certain distance from the x- and y-coordinates on the target 3D HD map; and a z-coordinate assignment process of assigning an average of z-coordinates of the 3D points to the lane point.

* * * * *